US012193913B2

(12) United States Patent
Long et al.

(10) Patent No.: US 12,193,913 B2
(45) Date of Patent: Jan. 14, 2025

(54) PET CARE KIT

(71) Applicant: Puppylation Health, LLC, Warson Woods, MO (US)

(72) Inventors: Samantha Long, St. Louis, MO (US); Nicolette Meredith, Scottsdale, AZ (US); Brittany McIntyre, St. Louis, MO (US)

(73) Assignee: PUPPYLATION HEALTH, LLC, St. Louis, MO (US)

(*) Notice: Subject to any disclaimer, the term of this patent is extended or adjusted under 35 U.S.C. 154(b) by 812 days.

(21) Appl. No.: 17/370,004

(22) Filed: Jul. 8, 2021

(65) Prior Publication Data

US 2022/0008184 A1 Jan. 13, 2022

Related U.S. Application Data

(60) Provisional application No. 63/049,334, filed on Jul. 8, 2020.

(51) Int. Cl.

*A61D 99/00* (2006.01)
*A61D 7/00* (2006.01)
*A61D 13/00* (2006.01)

(52) U.S. Cl.

CPC ............... *A61D 99/00* (2013.01); *A61D 7/00* (2013.01); *A61D 13/00* (2013.01)

(58) Field of Classification Search

CPC .......... A61D 99/00; A61D 7/00; A61D 13/00; A61F 17/00
USPC ................................ 206/570, 767, 528–540
See application file for complete search history.

(56) References Cited

U.S. PATENT DOCUMENTS

| | | | | |
|---|---|---|---|---|
| 4,848,588 A * | 7/1989 | Rasmussen | A45C 15/00 | 206/581 |
| 5,931,304 A * | 8/1999 | Hammond | A61F 17/00 | 206/570 |
| 7,565,979 B1 * | 7/2009 | Gibson | A61J 7/04 | 206/363 |
| 7,731,031 B1 * | 6/2010 | Weinberger | A47L 25/00 | 206/576 |
| 8,067,935 B2 * | 11/2011 | Burrows | A61J 7/0436 | 215/230 |
| 2005/0045519 A1 * | 3/2005 | Hirsch | A61J 7/0007 | 206/534 |
| 2008/0121554 A1 * | 5/2008 | Townsend | A45C 5/06 | 206/570 |
| 2011/0024323 A1 * | 2/2011 | Martorano | A61F 17/00 | 206/570 |
| 2014/0091001 A1 * | 4/2014 | Chan | B42D 15/00 | 283/67 |
| 2014/0214438 A1 * | 7/2014 | Ahmadi | A61J 1/035 | 206/534 |

(Continued)

*Primary Examiner* — Chun Hoi Cheung

(74) *Attorney, Agent, or Firm* — HOVEY WILLIAMS LLP

(57) ABSTRACT

A pet-care kit comprising a container, a quick-reference card, a number of alcohol wipes, a thermometer, a supply of hydrogen peroxide, a supply of over-the-counter medicines, an oral syringe, a pill splitter, a set of latex-free gloves, and a supply of lubricant. The container includes means for holding a photograph of a user's pet for associating the container with the user's pet and forms a chamber for retaining the other components of the pet-care kit. The quick-reference card includes information for responding to emergencies related to pet's health.

10 Claims, 5 Drawing Sheets

(56) References Cited

U.S. PATENT DOCUMENTS

| | | | | |
|---|---|---|---|---|
| 2015/0014211 | A1* | 1/2015 | Nickell | A61B 50/00 206/572 |
| 2018/0110918 | A1* | 4/2018 | Tennican | A61M 5/008 |
| 2020/0345938 | A1* | 11/2020 | Yamashita | C09D 183/04 |

* cited by examiner

PET CARE KIT

RELATED APPLICATIONS

This application is a regular utility non-provisional application and claims priority benefit of U.S. Provisional Patent Application Ser. No. 63/049,334, filed Jul. 8, 2020, titled "PET CARE KIT". The above-referenced provisional application is hereby incorporated by reference in its entirety.

BACKGROUND

Pet-focused first aid kits do not include over-the-counter medications and administrations or veterinary-approved instructions for treatment of gastrointestinal, allergy-related, and other conditions for pets. Instead, pet-focused first aid kits are only useful for treating injuries and are not able to be tailored to a specific pet.

SUMMARY

Embodiments of the present invention solve the above-mentioned problems and other related problems. More particularly, the present invention provides a pet-care kit comprising a container including instructions and medicinal preparations for the treatment of gastrointestinal, allergy-related, and other conditions for pets. The pet-care kit can also be tailored to a specific pet and can be customized to associate the pet-care kit with the specific pet.

The pet-care kit includes non-prescription medications and corresponding direction for use, and veterinary-recommended doses based on a pet's weight and instructions for how and when the medication should be administered. The pet-care kit also includes a thermometer and a quick-reference guide describing how to measure a pet's vital signs, understand the results, and identify safe ranges for using components of the pet-care kit.

Users may review the pet-care kit and its recommended use-case instructions with a veterinarian. Instructions in the pet-care kit may advise that the pet's veterinarian should be contacted before or after use of the pet-care kit. The pet-care kit may not be a substitute for veterinary care and in many cases should be used with consultation of the pet's veterinarian. With the instructions and medical preparations of the pet-care kit, the user is empowered to address emergency situations quickly and in a veterinarian-approved manner.

The pet-care kit is also unique in its capacity to be customized by a user. The pet-care kit may include a photograph slot allowing the user to tailor the pet-care kit for his pet, thereby creating an immediate visual reference of the pet-care kit's intended subject and purpose. The pet-care kit includes a container forming a central chamber for organizing and storing healthcare products, medication, and documents. Additional components house documents and reference information, such as Animal Poison Control and veterinarian contact information. Dosages and written components can be modified for different types of and specific pets. To that end, dosages may be specific to weight ranges or animal types. The pet-care kit can also be branded for individual veterinarian offices, thereby providing veterinarians with pet-care kits their clients can use with veterinarian approval and preventing potentially unnecessary veterinarian visits.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
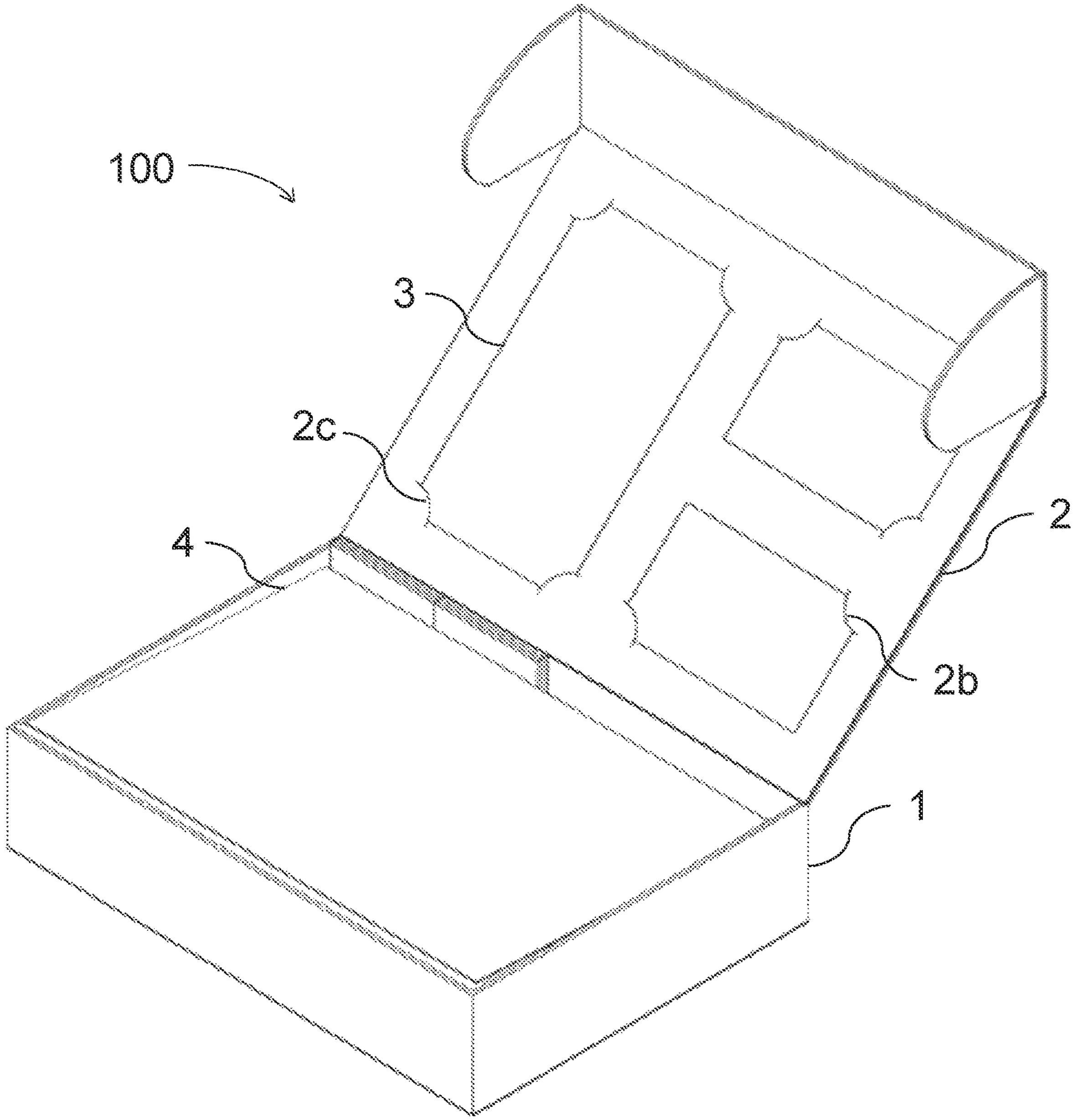
FIG. 1 is a perspective view of a pet-care kit constructed in accordance with an embodiment of the invention.
Figure 2:
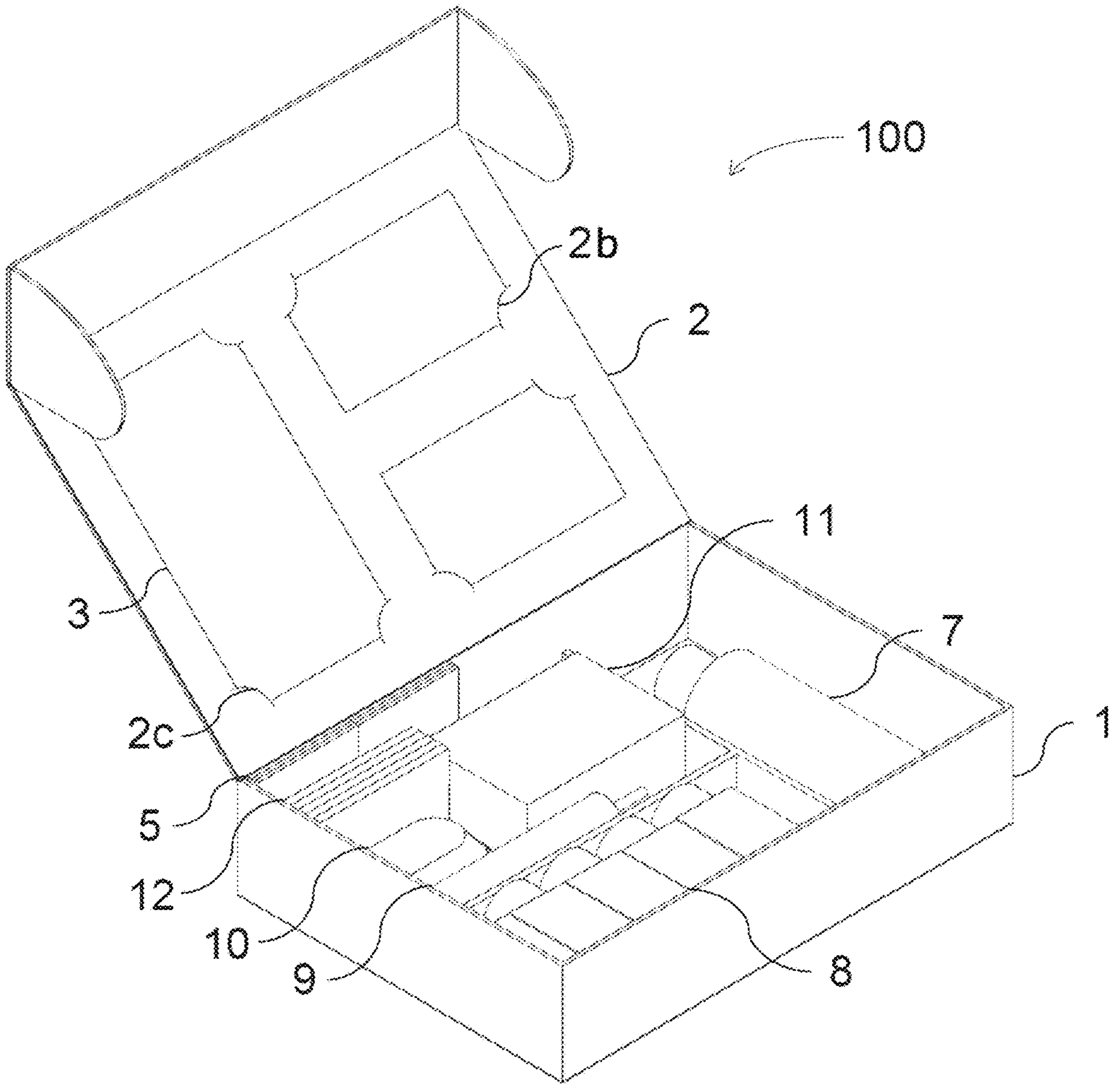
FIG. 2 is a perspective view of the pet-care kit of FIG. 1.
Figure 3:
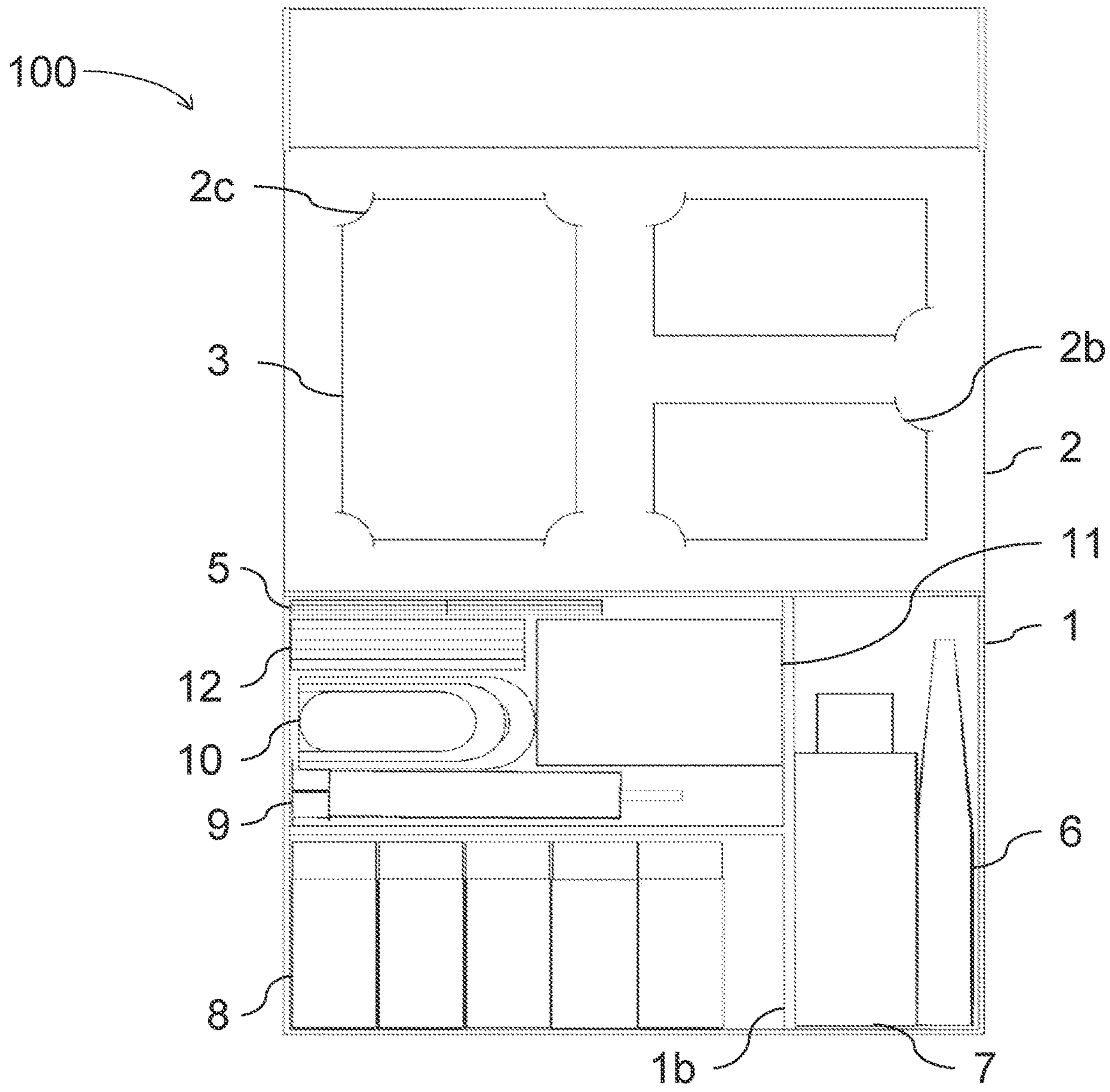
FIG. 3 is a plan view of the pet-care kit of FIG. 1.
Figure 4:
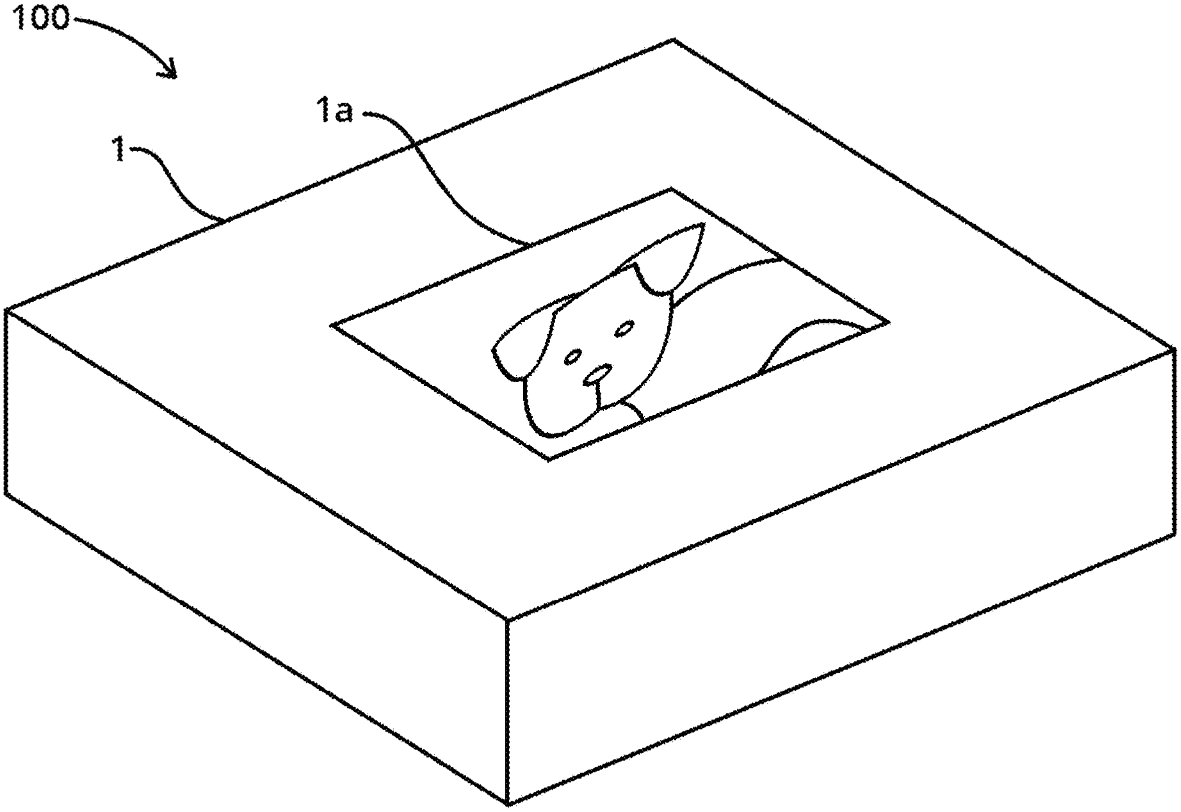
FIG. 4 is a top perspective view of the pet-care kit of FIG. 1.
Figure 5:
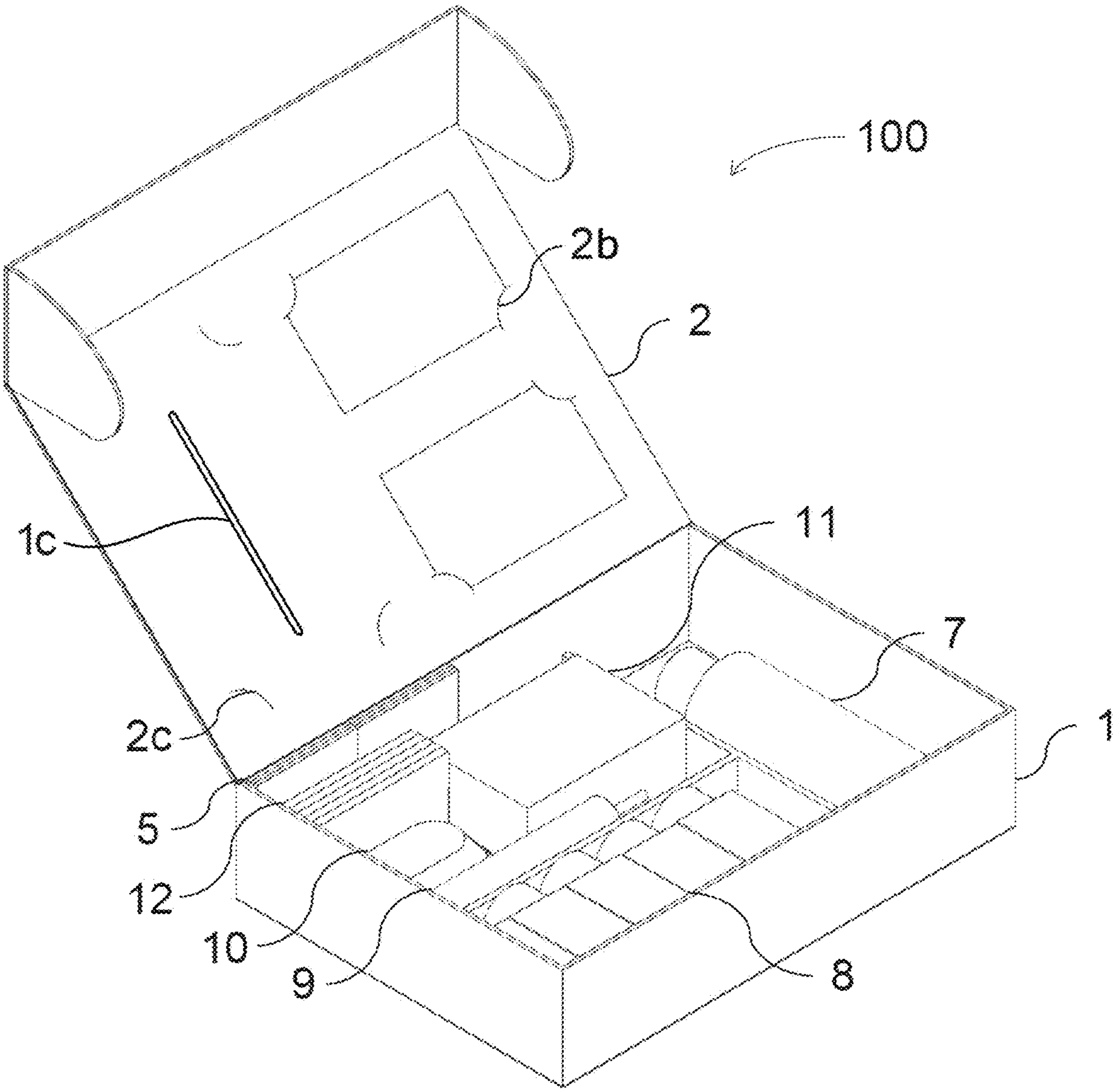
FIG. 5 is a top perspective view of the pet-care kit of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the claims of a subsequent patent, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, a pet-care kit 100 constructed in accordance with an embodiment of the invention is illustrated. The pet-care kit 100 broadly comprises a container 1, an interior panel 2, a quick-reference card 3, a folder booklet 4, alcohol wipes 5, a thermometer 6, hydrogen peroxide 7, a plurality of over-the-counter medicines 8, an oral syringe 9, a pill splitter 10, latex-free gloves 11, and lubricant jelly foil packets 12.

The container 1 stores the other components of the pet-care kit 10 and includes a photo insert window 1*a* and a divider 1*b*. The container 1 may be a box or similar component. The container 1 may be made of cardboard or other suitable material to withstand repeated use. The container 1 may include tabs that fold into sides of the container 1 to keep the container 1 closed when not in use. In one embodiment, the container 1 is a box having outer dimensions of at least 9 inches by 6 inches by 2 inches.

The photo insert window 1*a* may include a slot and opening located on a top exterior of the container 1 for placing a photograph of the user's dog and for customizing the container 1. The photograph, which may include the dog's name, allows the necessary party to recognize the container 1 as a device to be used for and with the identified dog. When assembled for sale, a stock photo of a dog may be positioned in the photo insert window 1*a*. In one embodiment, the photo insert window 1*a* is a 3.5 inch by 5.5 inch slot for a 4 inch by 6 inch photograph to be displayed on the top of the box. Product name and information may be printed above and below the photo insert window 1*a*.

The divider 1*b* may be affixed to an interior of the container 1 and may be made of paper, plastic, or any other suitable material. The divider 1*b* may be durable to withstand repeated insertion and removal of components in the container 1. The divider 1*b* may have a height of 1 inch and extend a full interior length or width of the container 1 or a 3 inch by 5 inch rectangle located near a corner of the container 1. The divider 1*b* keeps other components stationary and organized within the container 1. The divider 1*b* may also serve as support for the folder booklet described below.

The interior panel 2 is a multi-functional component in which a user may store, update, or replace informational cards and photographs. The interior panel 2 may include slots and placeholder information directing the user how to customize the pet-care kit 100. The interior panel 2 may be a piece of paper cardstock measuring 9 inches by 8.5 inches affixed on three sides to the front and upper panels of the interior lid of the container 1. The interior panel 2 may have one side featuring a stock photograph 2*a* visible through the photo insert window 1*a* and an opposite side including business card placeholder slots 2*b* and a quick-reference card placeholder slot 2*c*. Adhesive on three edges of the stock-photo side can affix the interior panel 2 to the interior lid of the container 1. The interior panel 2 being adhered to the container 1 provides added functionality to the container 1.

The stock photograph 2*a* may be a 4 inch by 6 inch image printed on one side of the interior panel 2. The stock photograph 2*a* may include an image of a dog, the dog's name, and a short description of how the user can insert a photograph of his dog with the dog's name to customize the container's exterior. The photograph is visible through the photo insert window 1*a*. The user may place his dog's photograph over the stock photograph by inserting the photograph between the container's lid and the interior cardstock through the gap (opening 1*c*) created by the un-adhered edge of the interior cardstock.

The business card placeholder slots 2*b* may be located on the top and bottom right side of the interior panel 2 and may be visible on the inside of the container 1. The slots 2*b* may be positioned to each fit a standard-sized business card (e.g., 3.5 inches by 2 inches) horizontally. The slots 2*b* may marked as a place where the user can insert his veterinarian and emergency clinic's business cards. The user may thus be able to quickly locate and reference the business cards when the pet-care kit 100 is used or another dog-related emergency occurs.

The quick-reference card placeholder slot 2*c* is configured to receive the quick-reference card 3 and may be affixed to the left interior of the container's lid. The slot 2*c* fits the quick reference card (e.g., a 3 inch by 5 inch card) placed vertically. The user may thus remove and reinsert the quick-reference card 3 as needed.

The quick-reference card 3 includes healthy vital sign ranges for dogs and may be located in the center left area of the interior panel 2 to be visible inside the container 1. The quick-reference card 3 may be made of cardstock and intended to be removed and re-inserted into the slot 2*c* upon use. The quick-reference card may be 3 inches by 5 inches and may include a telephone number for Animal Poison Control and generally acceptable dog vital sign ranges such as heart rate, breaths per minute, and temperature. Another side of the quick-reference card 3 may include text placeholders for the user to record his dog's pre-existing conditions and prescription medications as well as any other notes the user would like to record. The quick-reference card serves as a quick resource for contacting Animal Poison Control and reviewing acceptable vital sign ranges for dogs. The quick-reference card 3 may also be used by other caregivers of the dog to reference dosage and frequency of any prescriptions for the dog and any pre-existing conditions the dog may have that could potentially impact care or may be necessary to know during emergencies.

The folder booklet 4 includes a half-page horizontal pocket folder 4*a* and a half-page horizontal booklet 4*b*. The folder booklet 4, when assembled, may measure 9 inches by 6 inches. The folder booklet 4 may be stored in the container 1 on top of all other components that are not affixed to the lid of the container 1. The folder booklet 4 includes an introduction for the pet-care kit 100 directions for use of each component, and storage of pet-related paper records.

The pocket folder 4*a* includes an interior pocket located on its interior back panel. The pocket folder 4*a* may be 9 inches by 6 inches with a folder pocket of 9 inches by 2.75 inches. The folder pocket allows the user to insert standard-size paper measuring 8.5 inches by 11 inches folded in half width-wise. The folder pocket may be made of paper or plastic and may be durable enough for repeated insertion and removal of contents. The pocket folder 4*a* retains the booklet 4*b* and its pocket allows a user to store his dog's medical and vaccination records, certificates, registrations, care instructions, and other documents.

The booklet 4*b* may be eight 8.5 inch by 11 inch pages folded in half widthwise and made of paper. The booklet may be affixed to the pocket folder 4*a* via saddle stitching, staples, or another form of binding along the fold of the pocket folder 4*a* and the pages. The booklet 4*b* includes directions and reference information related to the user's dog's health and veterinary-approved treatments and guidance for symptoms presented and situations encountered. The booklet 4*b* includes easy-to-follow instructions to measure vital signs and administer each component of the pet-care kit. The booklet 4*b* may include definitions for medical and veterinary terms. The booklet 4*b* may also include a summary of the pet-care kit 100 and its purpose and a table of contents. The user may use this information to quickly refer to administrations and directions to discuss with his veterinarian based on symptoms present in his dog. One page in the booklet 4*b* may include information on how the user can observe and assess the dog's vital signs such as temperature, gum color, breathing, and heart rate. This page may include acceptable ranges and traits of each vital sign and instructions to complete each procedure. It may also reference use of the corresponding components of the pet-care kit 100. Other pages in the booklet 4*b* instruct the user how to administer the hydrogen peroxide 7 and the over-the-counter medicines 8. The booklet 4*b* may identify the following information for each of the administrations of medicine and hydrogen peroxide such as 1) how much should be administered to a dog based on its weight? 2) how should the component be administered? 3) what symptoms does the component address and when should the component be used? 4) what should you expect and how soon should you see the component's effects? 5) what pre-existing conditions or other medicines should this medicine not be used with? 6) what are common side effects? 7) what are side effects that would cause you to call a veterinarian or Animal Poison Control immediately? 8) what is appropriate after care?

The alcohol wipes 5 may include approximately five individually packaged, 70 percent isopropyl alcohol wipes. The alcohol wipes 5 may be used to disinfect the thermometer 6 after its use.

The thermometer 6 may be a digital thermometer or conventional thermometer. The thermometer 6 may have a flexible tip and may measure temperature in ten seconds or fewer. The thermometer 6 may be used to take the dog's temperature.

The hydrogen peroxide 7 may include a 4-ounce bottle of 3 percent liquid hydrogen peroxide. The hydrogen peroxide 7 may be administered orally to help a dog regurgitate swallowed items.

The over-the-counter medicines 8 may include five HDPE or PET plastic medicine pill bottles with child resistant or child-proof caps. Each bottle may include one of five over-the-counter medications to treat gastrointestinal or allergy-related issues. Each bottle may have a label with a QR code for the user to quickly access a website with pictographic descriptions of procedures for using the over-the-counter medicines 8 and additional reference information. The over-the-counter medicines 8 may include Diphenhydramine, Meclizine hydrochloride, Probiotic, Famotidine, and Loratadine. The The Diphenhydramine may be used to treat allergic reactions. Symptoms of an allergic reaction this medicine can treat include itching, hives, watery eyes, and red skin. Common possible causes of this kind of allergic reaction include insect bites and contact with or ingestion of a substance to which the dog is allergic.

The Meclizine hydrochloride may be used to treat nausea, dizziness, and motion sickness.

The Probiotic may be used to treat and provide after-care for gastrointestinal upset. Common signs of gastrointestinal upset in dogs include diarrhea, vomiting, and decreased appetite.

The Famotidine may be used to treat gastrointestinal upset. Common signs of gastrointestinal upset for which this medicine is intended include nausea, vomiting, and decreased appetite.

The Loratadine may be used to treat signs of allergies. Symptoms of allergies that can be treated with Loratadine include watery eyes and itchy, red skin. Loratadine is not intended to be used to treat a contact allergic reaction, allergic reaction to an ingested substance, or insect bites.

The oral syringe 9 may be a 20 milliliter, reusable oral syringe. The oral syringe 9 may be used to administer hydrogen peroxide or liquid medicine.

The pill splitter 10 may be used to divide the over-the-counter medicines 8 and other pills to achieve proper dosing based on the dog's weight.

The latex-free gloves 11 may include one to five pairs. The latex-free gloves 11 may be a standard size or one-size-fits-all to fit most users. The latex-free gloves 11 may be used to protect the user from directly touching fecal matter, lubricant, and other substances with which the user may come in contact.

The lubricant jelly foil packets 12 may include approximately five 3-gram, foil packets of lubricant jelly. The lubricant may be water-soluble, sterile, bacteriostatic, and safe for animal and human use. The lubricant may be used to lubricate the dog's anus and perineum prior to insertion of the thermometer 6 for taking the dog's temperature. The lubricant may lessen discomfort of this procedure.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A pet-care kit comprising:
- a box including means for holding a photograph of a user's pet for associating the box with the user's pet, the box forming a chamber;
- a quick-reference card including pet health emergency response information;
- a folder booklet including pet-care kit component usage directions;
- a plurality of disinfecting alcohol wipes;
- a business card placeholder slot configured to retain a business card;
- a digital thermometer including a flexible tip for taking the pet's temperature, the digital thermometer being configured to take a temperature in ten or fewer seconds;
- a bottle of orally administrable hydrogen peroxide;
- a plurality of bottles of over-the-counter medicines for treating various ailments of the pet, the over-the-counter medicines including Diphenhydramine, Meclizine hydrochloride, Probiotic, Famotidine, and Loratadine;
- a reusable oral syringe for administering the hydrogen peroxide or liquid medicines; and
- a pill splitter configured to divide some of the over-the-counter medicines into smaller doses.

2. The pet-care kit of claim 1, the means for holding the photograph being a photograph insert window on an exterior of the box, wherein the box is configured to receive the photograph such that the photograph is viewable via the photograph insert window when the box is closed.

3. The pet-care kit of claim 2, the box further including an opening in communication with the photograph insert window, the opening being accessible only when the box is open.

4. The pet-care kit of claim 3, the box comprising a lid, wherein the photograph insert window is on an outside of the lid and the opening is on an inside of the lid.

5. The pet-care kit of claim 1, further comprising a plurality of foil packets of water-soluble, sterile, bacteriostatic, animal-safe lubricant jelly.

6. The pet-care kit of claim 5, wherein each of the plurality of foil packets includes approximately 3 grams of lubricant jelly.

7. The pet-care kit of claim 1, each of the plurality of bottles including a QR code that accesses a website of additional reference information.

8. The pet-care kit of claim 1, wherein the oral syringe is a 20 milliliter syringe.

9. The pet-care kit of claim 1, wherein the hydrogen peroxide is 3 percent liquid hydrogen peroxide.

10. A pet-care kit comprising:

a box forming a chamber and comprising a lid including a photograph insert window on an outside of the lid and an opening on an inside of the lid, wherein the box is configured to receive a photograph of a user's pet via the opening when the box is open, and wherein the photograph is viewable via the photograph insert window when the box is closed;

a quick-reference card including pet health emergency response information;

a folder booklet including pet-care kit component usage directions;

a plurality of disinfecting isopropyl alcohol wipes;

a business card placeholder slot configured to retain a business card;

a digital thermometer including a flexible tip for taking the pet's temperature, the digital thermometer being configured to take a temperature in ten or fewer seconds;

a plurality of foil packets of water-soluble, sterile, bacteriostatic, animal-safe lubricant jelly;

a bottle of orally administrable hydrogen peroxide;

a plurality of bottles of over-the-counter medicines for treating various ailments of the pet, the over-the-counter medicines including Diphenhydramine, Meclizine hydrochloride, Probiotic, Famotidine, and Loratadine, each of the plurality of bottles including a QR code that accesses a website of additional reference information;

a reusable oral syringe for administering the hydrogen peroxide or liquid medicines; and a pill splitter configured to divide some of the over-the-counter medicines into smaller doses.

* * * * *